Dec. 22, 1936.  H. M. CREIGHTON ET AL  2,065,054
ACTIVE RAY TREATING DEVICE
Original Filed Oct. 8, 1931  4 Sheets-Sheet 2
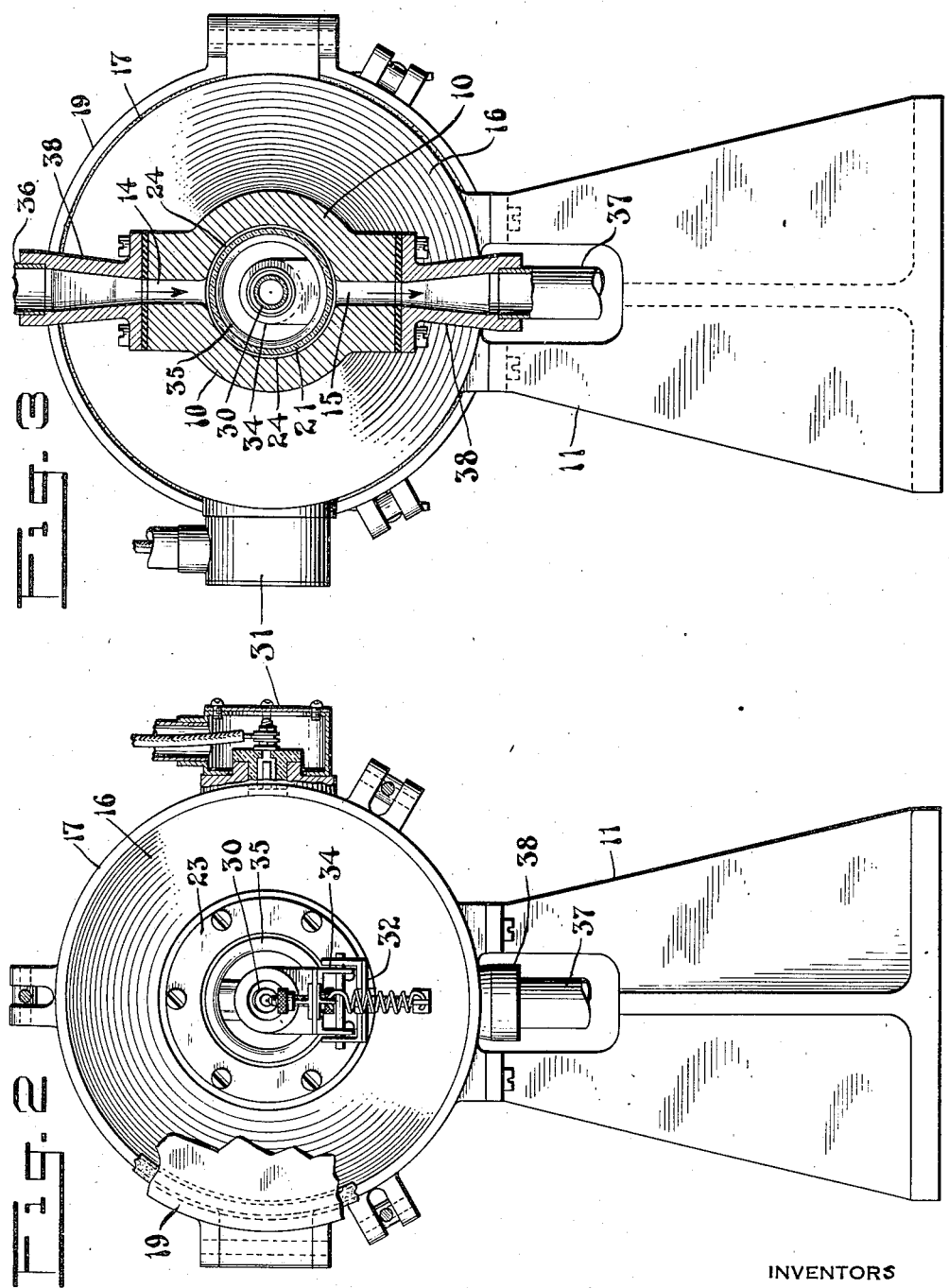
INVENTORS
Harry M. Creighton and Edward C. Berndt
BY
Bohleber + Ledbetter
ATTORNEYS Dec. 22, 1936.  H. M. CREIGHTON ET AL  2,065,054
ACTIVE RAY TREATING DEVICE
Original Filed Oct. 8, 1931   4 Sheets—Sheet 3

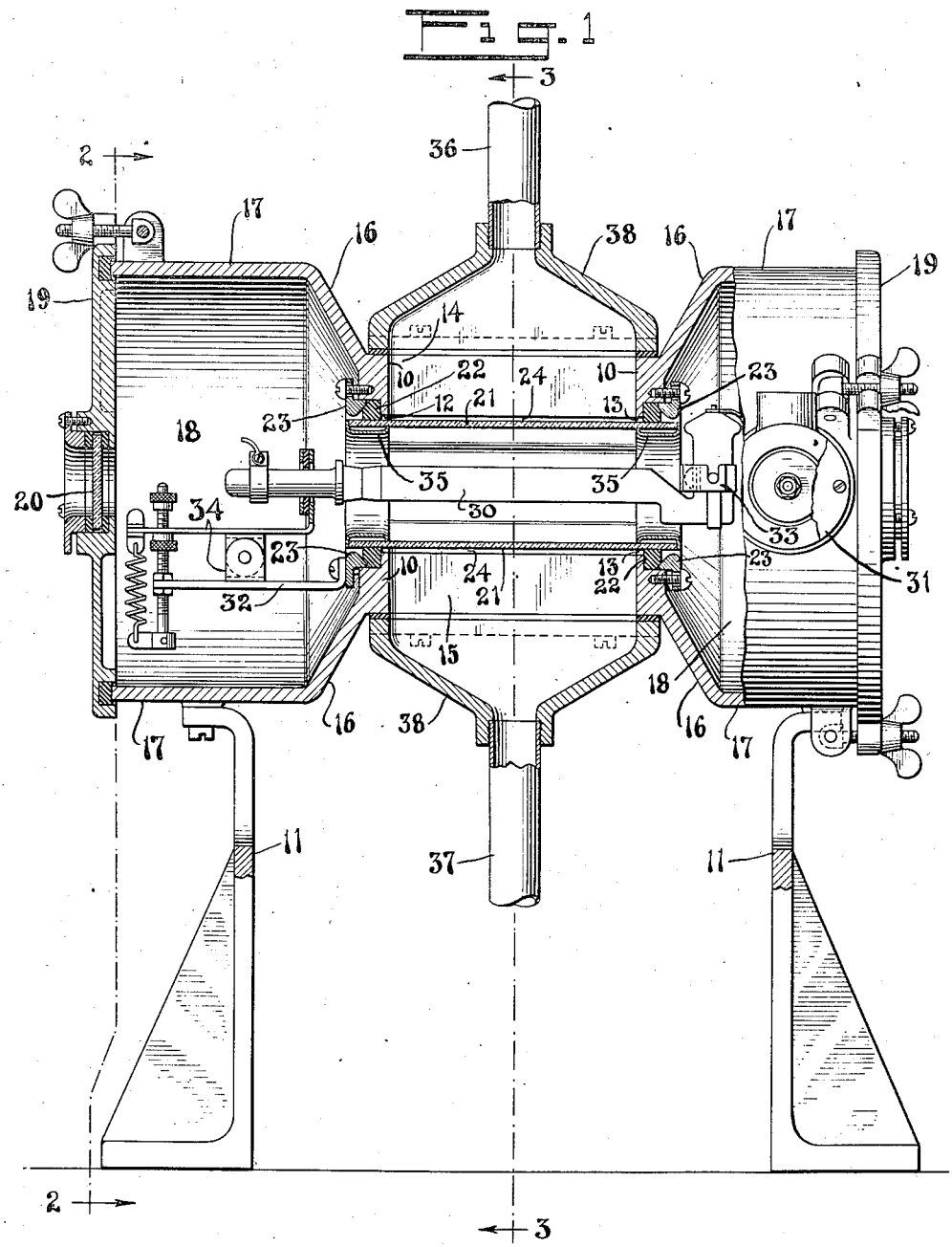

INVENTORS
Harry M. Creighton & Edward C. Berndt
BY
Bohleber & Ledbetter
ATTORNEYS

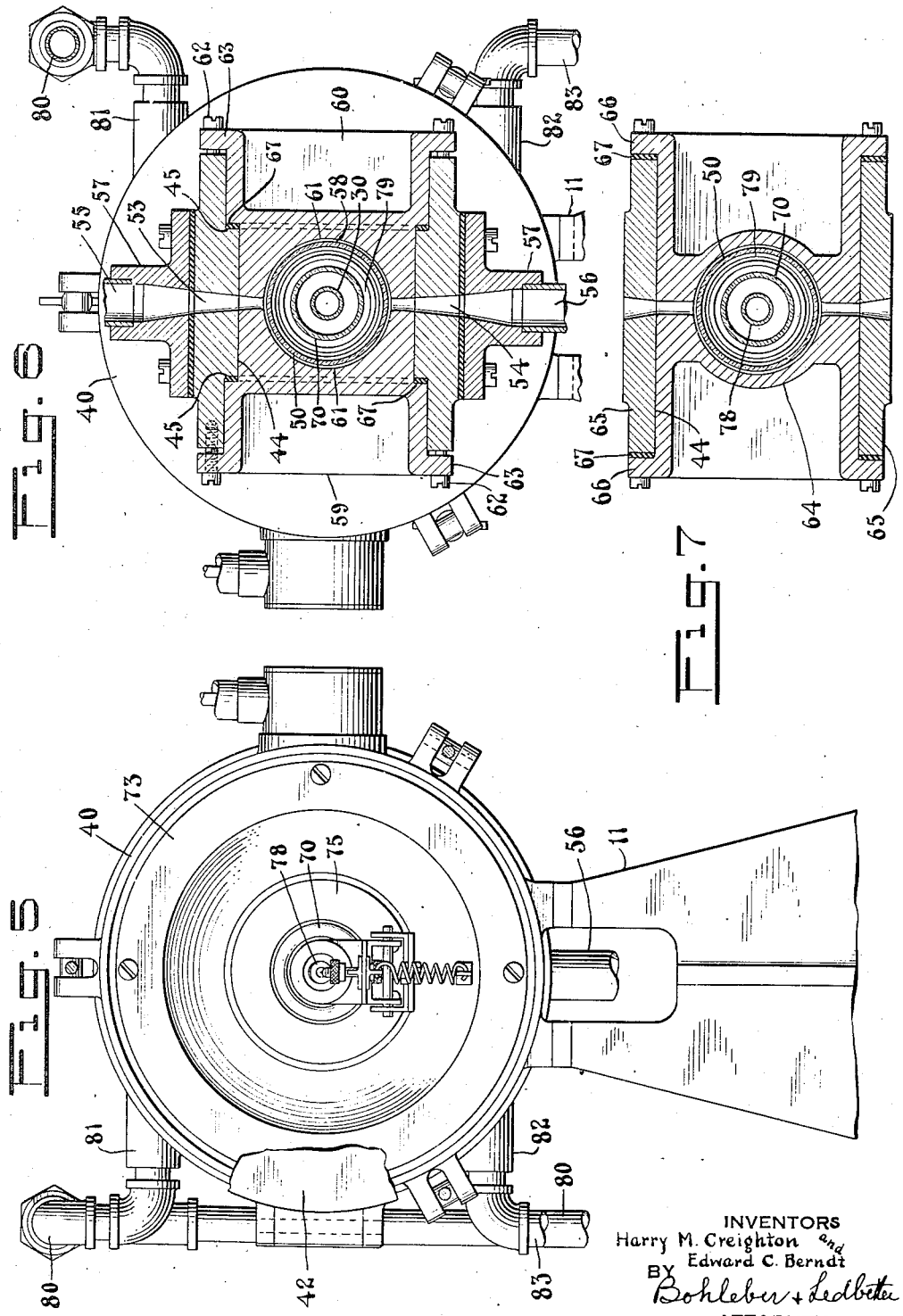

Patented Dec. 22, 1936

2,065,054

UNITED STATES PATENT OFFICE 2,065,054

ACTIVE RAY TREATING DEVICE

Harry M. Creighton, East Norwalk, and Edward C. Berndt, Norwalk, Conn., assignors to The R. U. V. Engineering Corporation, South Norwalk, Conn., a corporation of Delaware Application October 8, 1931, Serial No. 567,574
Renewed April 29, 1936

8 Claims. (Cl. 99—247)

This invention relates to improvements in the construction of machines for treating substances with active rays for the purpose of sterilizing and activating the substance.

It is generally known that active rays, such as ultra-violet rays, or other rays emanating from the light produced by a quartz mercury vapor lamp, impart certain beneficial properties to substances such as foodstuffs and make them particularly desirable as food for both man and animals. In a word, active ray irradiation produces certain physiological changes in the substance and it has been found by tests that when irradiated substances are fed to animals possessing the deficiencies in bone composition, known as rickets, that the bone composition becomes normal and substances possessing such properties are referred to as being antirachitically active. Moreover, the treatment of substances by active ray irradiation sterilizes the substances by killing the organisms therein.

During the operation of irradiating machines the temperature of the machine as a whole is elevated due to the heat generated by the mercury vapor lamp. We have found that in some cases it is desirable to irradiate substances without increasing their temperature any more than necessary and to this end have contrived to reduce the time required to pass the substance through the machine, past the light rays, by shortening the path traversed by the substance and constructing the parts of the machine which form such path so as to avoid the use of projecting baffles and the like and not impair the efficiency of the machine. Obviously the temperature of the substance will unavoidably be somewhat increased during the time it is exposed to the ultra-violet light rays and this increase cannot be reduced without shortening the period of irradiation and thereby give the substance a proportionately incomplete treatment. While others have suggested a re-treatment of the substance in cases of incomplete initial irradiation this also occasions a temperature rise in the substance.

Hence we have designed a machine in which the substance enters immediately into the treating chamber proximate the light source and immediately after being treated is conducted away from the light source and out of the machine. The path or chamber traversed by the substance treated in our machine both before and after being exposed to the influence of the light rays is not appreciably raised in temperature due to the operating temperature of the machine itself.

While our machine may be used for treating many different substances it is particularly adapted for use in dairies for treating milk.

One of the objects of our present invention is to produce a machine in which the substance to be treated, after entering the machine, is immediately conducted directly into contact with the light source, i. e., the region in which the light rays are of the highest available intensity, and after treatment immediately conducted to the outside of the machine.

Another object is to produce an active ray machine, for use in dairies for sterilizing and activating milk, which not only contains as few parts as possible but one in which such parts are so constructed that the machine may be readily and easily dismantled for cleaning and inspection.

Another object is to provide a treating machine having a chamber in which there are no moving parts, projecting baffles or inaccessible corners or crevices.

Another object is to provide a machine of the class described provided with a chamber disposed between the treating chamber and light source through which a cooling or filtering medium may be circulated if desired.

Further objects and advantages of our invention will be hereinafter referred to or become apparent from the description of our machine, or the appended claims.

Referring now to the drawings which form a part of our specification:

Figure 1 shows a side elevational view partly in section of an active ray treating machine in which the substance to be treated, immediately upon entering the machine, is caused to flow past a quartz mercury vapor lamp located in a constricted central portion of the housing of the machine, and afterwards is immediately discharged.

Figure 2 shows a front elevation of the machine taken on the line 2—2 shown in Figure 1 with the front plate broken away to show the manner of mounting the ultra-violet lamp.

Figure 3 is a sectional elevational view of the machine taken on line 3—3 of Figure 1, showing the relationship between the inlet and outlet ports and the treating chamber of the machine which define the path through which the substance to be treated is conducted past a quartz cylinder surrounding an ultra-violet lamp.

Figure 5 shows a front elevation taken on the line 5—5 of the machine shown in Figure 4.

Figure 6 is a sectional elevation of the machine taken on line 6—6 of Figure 4 in which the treating chamber is formed in a transverse opening in the housing of the machine by a quartz tube surrounding the mercury vapor lamp and the apposed ends of a pair of removable side members having cylindrically concaved faces.

Figure 7 shows a modified form of side pieces for forming a treating chamber similar to that shown in Figure 6.

Figure 4:
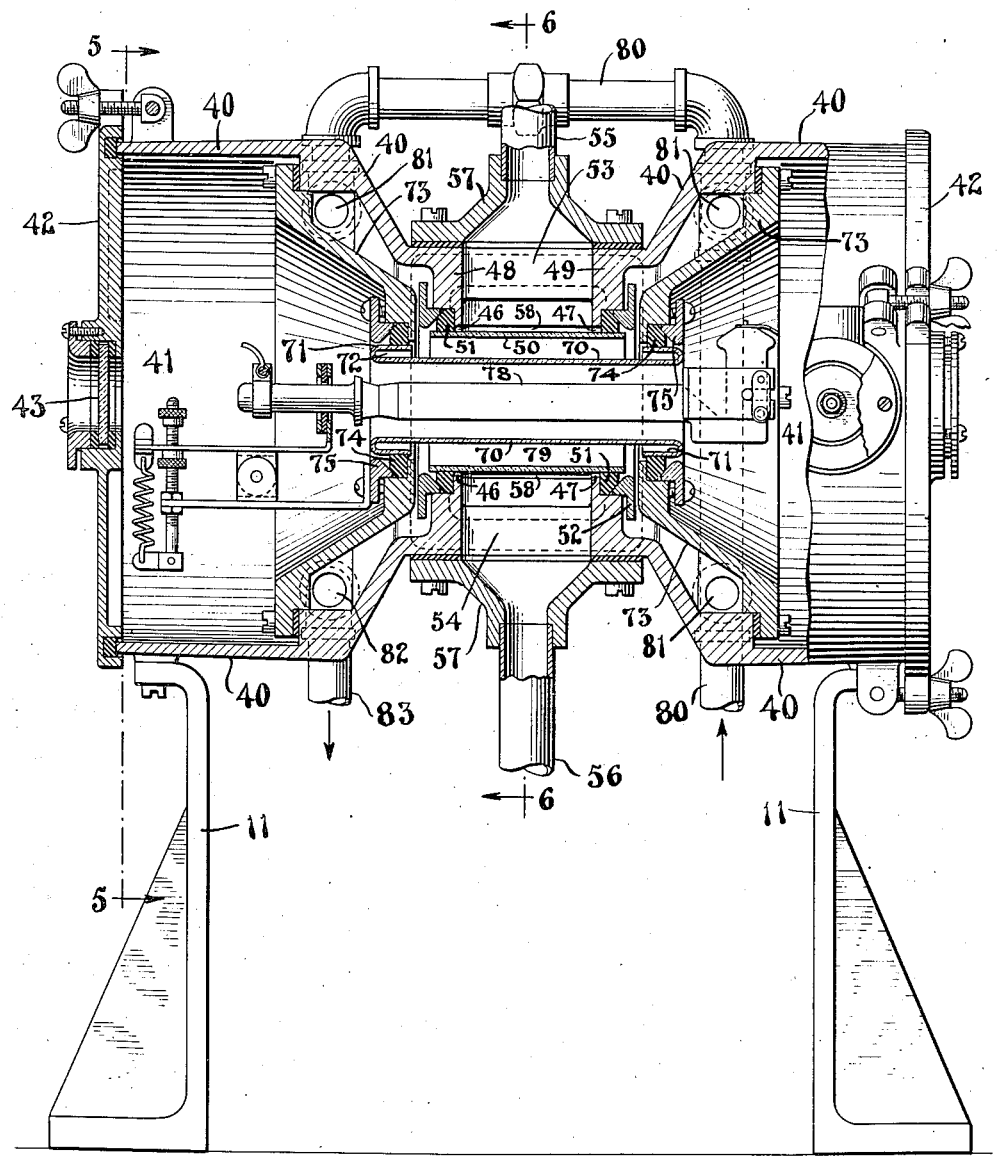
Figure 4 shows a modified form of the machine as shown in Figure 1 comprising a second chamber disposed between the light source and treating chamber and through which a fluid filtering or cooling medium is adapted to be circulated.

Referring to the above described drawings in which numerals are employed to designate corresponding parts illustrated in the several figures thereof, and particularly to Figure 1, it will be seen that our machine comprises a housing, indicated generally by the numeral 10, mounted on supports 11, which supports may be of any desired construction according to the location in which the machine is to be used. The central portion of the housing 10 is hollow and of substantially cylindrical formation and is provided with openings 12 and 13 at each end and elongated inlet and outlet ports 14 and 15 at each side. The inlet and outlet ports, in effect, are merely elongated openings or slots in the housing extending for a distance equal to the distance between the openings 12 and 13. The housing is also flared outwardly at each side beyond the openings 12 and 13 in a form resembling hollow truncated cones 16 and cylinders 17 to form chambers 18 at each side of the machine. Doors 19, provided with peep holes 20, are hinged at each side of the machine and adapted to be locked or fastened thereto in any suitable manner so as to cover the chambers 18 to prevent the accumulation of dirt and dust therein and at the same time to permit one to observe the operation of the machine without opening the doors.

A quartz tube 21 is securely mounted and sealed in the housing 10 by means of packing rings 22 and packing glands 23 disposed near the openings 12 and 13. The quartz tube is somewhat smaller in diameter than the central cylindrical portion of the housing and when it is mounted in the housing, as shown in the drawings, it forms a cylindrical chamber 24 which we shall refer to hereinafter as a treating chamber. It will be seen from Figures 1 and 3 that the inlet and outlet ports 14 and 15 open directly into the chamber 24.

A quartz mercury vapor lamp 30, or other source of active rays, is mounted within the tube 21 by any suitable means and is adapted to be illuminated by electric current supplied to the lamp conductors, disposed in a junction box 31, from any suitable source and in any well known manner. As the mercury vapor lamp, its operating means, its mounting means and the manner of supplying electric current thereto, per se, forms no part of our invention, aside from the combination claimed herein, we shall not describe it except to say that the lamp 30 is mounted on suitably formed supports, 32 and 33, carried by the packing glands 23 and located at each end of the machine respectively and is equipped with a tilting mechanism 34, of any well known construction, adapted to start the flow of current or arc through the lamp.

Collars 35 having their ends outwardly flared are disposed at each end of the tube 21 to protect the packing ring 22 from the light rays and thereby retard the disintegration thereof. The ends of the collars are flared and serve to form an annular opening between the collar and tube to reduce the transfer of heat from the lamp to the tube at the point where the packing ring 22 is located.

Pipes 36 and 37, through which the substances to be treated are conducted to and/or from the treating chamber 24, are connected to the inlet and outlet ports 14 and 15, respectively, by means of flared couplers 38. The couplers 38 are internally threaded to receive the threaded ends of the pipes 36 and 37 while the other ends of the couplers are of such size and construction as to adapt them to be fastened to the housing 10 over the elongated inlet and outlet ports 14 and 15, respectively, to connect these ports to the pipes 36 and 37.

While we have described the openings 14 and 15 at the sides of the treating chamber 24 as inlet and outlet ports, respectively, these terms are merely relative because as a matter of fact it is immaterial in which direction the substance to be treated is passed through the machine and inasmuch as these ports are identical in construction these openings may be used interchangeably as inlet and outlet ports and hence their names depend upon the direction the substance is flowing through the machine.

From the above description it will be apparent that because of the shortness of the path through the constricted central portion of our machine, which contains an elongated treating chamber and oppositely disposed openings coextensive therewith for the admission and withdrawal of the substance from the chamber by what seems to us to be the quickest and most direct way, the only heating which the substance will receive is that due to the direct contact with the light rays as it passes through the machine (a distance substantially equal to half the circumference of the chamber) in the form of streams or layers.

Referring now to Figures 4, 5 and 6 showing a modified form of the machine just described, it will be seen that the housing 40 is essentially the same shape as the housing 10, illustrated and described in connection with Figure 1, in that chambers 41 are formed at each side thereof and are provided with doors 42 having peep holes 43 and fasteners to lock or hold the doors in closed position for the purpose of closing the chambers 41. Through the central portion of the housing 40, however, normal to the axis of the chambers 41, is a rectangular opening 44 extending through the machine from side to side, see Figure 6, and provided at each side with a seat 45. The housing 40 is also provided with two circular openings 46 and 47 formed in alignment with the longitudinal axis of the machine in what we shall call for the want of a better name, the front and back walls 48 and 49. The walls 48 and 49 correspond to similar wall like members, shown in Figure 1, and in which the openings 12 and 13 are formed.

A quartz tube 50 is mounted in the openings 46 and 47 by means of packing rings 51 and glands 52 similar to the manner in which the tube 21 is mounted in the machine shown in Figure 1. Narrow elongated inlet and outlet ports 53 and 54 are formed in the center of the housing 40 at the top and bottom and extend lengthwise of the housing for a distance equal to the distance between the openings 46 and 47. Pipes 55 and 56, through which the substances to be treated are conducted to and/or from the machine, are connected to the inlet and outlet ports 53 and 54 through flanged or fan shaped couplers 57 similar in construction to the couplers 38 above described.

A treating chamber 58 of uniform cross-section is formed about the tube 50 by means of side members 59 and 60 which in effect, are rectangular blocks having their inside surface formed with a semi-cylindrically concaved face 61 and adapted to fit approximately half-way around the tube 50 when they are located in the ends of the opening 44 and drawn tightly against the seats 45 by screws 62 passing through flanges 63 formed on the periphery of the outside surfaces.

Figure 7 shows a modified form of the opening 44 in which the side members 64 are drawn into position against the housing 65 by the flange 66 instead of being drawn against seats like those shown in Figure 6, at 45. It will be seen that gaskets 67 are provided at the joints, between the housing and the couplings and also between the housing and the side members 59 and 60, to prevent leakage of the substance being treated.

Referring again to Figure 4 it will be seen that a second quartz tube 70, having its ends flared outwardly and bent back upon itself to form a reversely extending cylindrical portion or collar 71 integral with the tube 70 and spaced therefrom to form a chamber portion 72 between the tube 70 and collar 71, is mounted in spaced relationship with respect to the tube 50. The mountings for the tube 70 are frusto-conically shaped plates 73 disposed within the chambers 41 and secured in the housing 40. The tube 70 is rigidly secured and sealed in the plates 73 by means of packing rings 74 and glands 75 similar to those used for mounting the tube 50.

A quartz mercury vapor lamp 78 is disposed within the tube 70 and is provided with mounting means and means for operating it similar to that described above in connection with the lamp 30.

From the structure just described it will readily appear that the housing 40, tube 50, tube 70 and plates 73 form a chamber 79 disposed between the lamp 78 and the treating chamber 58. The chamber 79 is adapted to receive a cooling or filtering medium, from a source of supply not shown, through a pipe 80 having three openings 81 in the chamber 79. The filtering medium is adapted to be discharged from the chamber 79 through the opening 82 and pipe 83 into a receptacle, also not shown. We provide for admitting the filtering medium to the chamber 79 at three places to prevent the formation of stagnant or inactive pools of the medium in the chamber.

From the above description it will be seen that we have devised a mechanism which is adapted to be readily dismantled for inspection and cleaning and one in which there are no inaccessible pockets, crevices or corners in which dirt may collect and which would be difficult to clean.

In the machine shown in Figures 1, 2 and 3 the tube 21, lamp 30 and couplings 38 may be easily removed and cleaned, making the smooth cylindrical inside portion of the housing and the elongated ports easily accessible for cleaning without moving the machine from its mounting. In the machine shown in Figures 4, 5, 6 and 7, when the side members 59 and 60 are removed the tube 50 and the openings 53 and 54 may be easily cleaned without removing the tube.

While we have described what now seems to us to be the preferred embodiment of a machine which will accomplish the objects set forth above, we do not want our invention limited to the details of construction illustrated and described herein because they are susceptible of modification without departing from the spirit of our invention or exceeding the scope of the appended claims.

What is claimed is:

1. A machine wherein a stream or layer of a substance to be treated is adapted to flow transversely past a source of active rays comprising a closed housing, an elongated lamp and mechanism for starting said lamp mounted in said housing, said housing comprising end chambers surrounding the ends of the lamp and starting mechanism, a constricted central portion forming a treating chamber immediately surrounding said lamp, and elongated openings formed in said constricted portion, said openings being adapted to be interchangeably used as inlet and outlet ports for the passage of substance to be treated in the chamber, in combination with a pipe adapted to carry a substance to be treated, and elongated fan-shaped couplings for connecting said pipe to the housing over said openings.

2. A machine wherein streams or layers of a substance to be treated are adapted to simultaneously flow transversely past a source of active rays comprising a closed housing, an elongated lamp mounted in the housing, said housing comprising end chambers surrounding the ends of the lamp, a constricted central portion between said end chambers forming a transverse opening through the housing about the lamp, closure members mounted in each end of said opening and adapted to form a treating chamber surrounding said lamp, said housing having elongated openings in the constricted portion thereof co-extensive with the length of the lamp and adapted to direct the flow of the substance around the lamp and between the apposed faces of said closure members.

3. A machine wherein streams or layers of a substance to be treated are adapted to simultaneously flow transversely past a source of active rays comprising a closed housing, an elongated lamp mounted in the housing, said housing comprising end chambers surrounding the ends of the lamp, a constricted central portion between said end chambers forming a transverse opening through the housing about the lamp, closure members having a cylindrically concaved face and being adapted to be drawn into each end of said opening to form a treating chamber surrounding said lamp, means for locating said members in spaced relationship with each other and the lamp when they are drawn into position, said housing also forming elongated openings in said constricted portion thereof co-extensive with the lamp and the length of the faces of the closure members and adapted to direct the flow of the substance around the lamp between the apposed faces of said closure members.

4. A machine wherein streams or layers of a substance to be treated are adapted to simultaneously flow transversely past a source of active rays comprising a closed housing, a pair of transversely disposed spaced walls in said housing, an elongated lamp mounted between said walls and adapted to radially emit active rays throughout its length, a cylindrical treating chamber disposed between the walls and co-extensively surrounding said lamp, and a second chamber between the treating chamber and the lamp adapted to contain a fluid medium, said chambers comprising concentric quartz tubes mounted in spaced relationship to said housing and lamp, said treating chamber having elongated openings therein co-extensive with the length thereof and adapted to be interchangeably used as inlet and outlet ports for the passage of substance to be treated in the chamber, and a plurality of inlet ports through which a fluid medium may enter the second chamber and an outlet port in said chamber.

5. A device for treating substances with active rays comprising a closed treating chamber of uniform cross-section, an elongated source of ultra violet rays to irradiate substance disposed in said chamber, said chamber also comprising elongated inlet and outlet openings substantially co-extensive with the length of said chamber through which a substance to be treated is immediately conducted to or withdrawn from said chamber, in combination with pipes to carry substance to and from said device, and fan-shaped couplings for connecting said pipes to the chamber over said openings whereby the character of the flow of the substance in passing through said chamber is such that the rate of flow in all portions of said chamber is substantially the same.

6. A machine for treating substances with active rays comprising a housing having a central portion formed by a tube transparent to active rays, a source of active rays mounted in the housing, transverse openings in the housing to permit access to a surface of said tube throughout the length of the central portion of said housing, a closure member mounted in each opening, each of said members having a face adapted to form with the tube a treating chamber surrounding said lamp, and other openings in said housing coextensive with the length of the central portion thereof adapted to direct the flow of the substance over a surface of said tube and between the apposed faces of said closure members.

7. A machine for treating liquid substances with active rays comprising means mounting an elongated source of active rays, and a tube transparent to said rays surrounding said source in combination with an enclosed treating chamber formed with the transparent tube for directing the flow of the substance over the outside surface of the transparent tube including a plurality of closure members each of which covers a portion of the periphery of the transparent tube and all of which are mounted to enclose the periphery of the transparent tube except for that portion providing an inlet and outlet and for such part of the tube length as is desired to be in contact with the substance, each of said members forming a part of the enclosed treating chamber surrounding said lamp and adapted to direct the flow of the liquid substance over the outside surface of said tube and between the apposed face of each closure member and the tube, and the closure members being spaced from each other at least for the greater part of their length axially with respect to the treating chamber thereby forming openings leading to and from said treating chamber.

8. A machine for treating liquid substances with active rays comprising means mounting an elongated source of active rays, and a tube transparent to said rays surrounding said source in combination with an enclosed treating chamber formed with the transparent tube for directing the flow of the substance over the outside surface of the transparent tube including a plurality of closure members each of which covers a portion of the periphery of the transparent tube and all of which are mounted to enclose the periphery of the transparent tube except for that portion providing an inlet and outlet and for any desired part of the tube length, each of said members forming a part of an enclosed treating chamber surrounding said lamp and adapted to direct the flow of the liquid substance over the outside surface of said tube and between the apposed face of each closure member and the tube, the closure members being spaced from each other at least for the greater part of their length axially with respect to the treating chamber thereby forming openings leading to and from said treating chamber, and mounting means for the closure members holding them together in assembled relation about the transparent tube and enabling the closure members to be moved away from each other thereby exposing the interior surfaces thereof, the exterior surface of the transparent tube and the surfaces of the passages for cleaning.

HARRY M. CREIGHTON.
EDWARD C. BERNDT.